United States Patent
Park et al.

(10) Patent No.: US 10,714,778 B2
(45) Date of Patent: Jul. 14, 2020

(54) MEMBRANE-ELECTRODE ASSEMBLY FOR FUEL CELLS HAVING IMPROVED DURABILITY AND A POLYMER ELECTROLYTE MEMBRANE FUEL CELL INCLUDING THE SAME

(71) Applicants: Hyundai Motor Company, Seoul (KR); Kia Motors Corporation, Seoul (KR)

(72) Inventors: InYu Park, Gyeonggi-Do (KR); Jae Jun Ko, Gyeonggi-Do (KR); Bo Ki Hong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/131,843

(22) Filed: Sep. 14, 2018

(65) Prior Publication Data
US 2019/0198903 A1 Jun. 27, 2019

(30) Foreign Application Priority Data
Dec. 27, 2017 (KR) .................. 10-2017-0181118

(51) Int. Cl.
| | |
|---|---|
| *H01M 8/10* | (2016.01) |
| *H01M 8/1051* | (2016.01) |
| *H01M 4/86* | (2006.01) |
| *H01M 8/1004* | (2016.01) |
| *H01M 8/1018* | (2016.01) |

(52) U.S. Cl.
CPC ....... *H01M 8/1051* (2013.01); *H01M 4/8663* (2013.01); *H01M 8/1004* (2013.01); *H01M 2008/1095* (2013.01); *H01M 2250/20* (2013.01)

(58) Field of Classification Search
CPC ............ H01M 8/1051; H01M 8/1004; H01M 4/8663; H01M 2008/1095
See application file for complete search history.

(56) References Cited

U.S. PATENT DOCUMENTS

| | | | | |
|---|---|---|---|---|
| 2007/0003803 A1* | 1/2007 | Omasa | ............... | H01M 8/0656 429/422 |
| 2010/0167169 A1* | 7/2010 | Day | ................... | H01M 8/0232 429/495 |

FOREIGN PATENT DOCUMENTS

JP 2014049320 A * 3/2014

OTHER PUBLICATIONS

S. Schlick et al., "Scavenging of Hydroxyl Radicals by Ceria Nanoparticles: Effect of Particle Size and Concentration", The Journal of Physical Chemistry, vol. 120, pp. 6885-6890 (2016).
S. Deshpande et al., "Size dependency variation in lattice parameter and valency states in nanocrystalline cerium oxide", Applied Physics Letters, vol. 87, pp. 133113-1-133113-3 (2005).

* cited by examiner

*Primary Examiner* — Jane J Rhee
(74) *Attorney, Agent, or Firm* — Mintz Levin Cohn Ferris Glovsky and Popeo, P.C.; Peter F. Corless (57) ABSTRACT

Disclosed are a membrane-electrode assembly for fuel cells with improved durability and a polymer electrolyte membrane fuel cell including the same. The membrane-electrode assembly includes an antioxidant, Sm-doped cerium oxide in the electrolyte membrane, which has a controlled microstructure through high-temperature heat treatment, thereby providing both superior antioxidant activity and excellent long-term stability.

17 Claims, 4 Drawing Sheets

MEMBRANE-ELECTRODE ASSEMBLY FOR FUEL CELLS HAVING IMPROVED DURABILITY AND A POLYMER ELECTROLYTE MEMBRANE FUEL CELL INCLUDING THE SAME

CROSS-REFERENCE TO RELATED APPLICATION

This application claims, under 35 U.S.C. § 119(a), the benefit of priority to Korean Patent Application No. 10-2017-0181118 filed on Dec. 27, 2017, the entire contents of which are incorporated herein by reference.

TECHNICAL FIELD

The present invention relates to a membrane-electrode assembly for fuel cells with improved durability and a polymer electrolyte membrane fuel cell including the same.

BACKGROUND

Polymer electrolyte membrane fuel cells for vehicles are devices which generate electricity by electrochemical reaction between hydrogen and oxygen in the air and are well-known as environmentally friendly next-generation energy sources that have high electricity-generation efficiency and almost no exhaust materials, except for water. In addition, polymer electrolyte membrane fuel cells generally operate at a temperature of 95° C. or less and have high power density.

The reaction for electricity production by fuel cells occurs in a membrane-electrode assembly (MEA) which includes a perfluorinated sulfonic acid ionomer-based membrane and a pair of electrodes such as an anode and a cathode. Hydrogen supplied to an anode, which is an oxidation electrode for fuel cells, is split into a proton and an electron, and then the proton is moved through the membrane to a reduction electrode, that is, a cathode. As consequence, the electron is moved via an exterior circuit to the cathode. Then, at the cathode, an oxygen molecule, the proton and the electron react together, to produce electricity and heat, and at the same time, water ($H_2O$) is produced as a by-product.

In general, hydrogen and oxygen in the air, which are reaction gases for fuel cells, crossover through the electrolyte membrane to facilitate production of hydrogen peroxide (HOOH). The hydrogen peroxide produces oxygen-containing radicals such as a hydroxyl radical (.OH) and a hydroperoxyl radical (.OOH). These radicals attack the perfluorinated sulfonic acid-based electrolyte membrane, inducing chemical degradation of the membrane, which finally has negative impact of reducing durability of fuel cells.

As a conventional technology to mitigate such chemical degradation of the electrolyte membrane, various kinds of antioxidants to the electrolyte membrane has been added.

For example, an antioxidant includes a primary antioxidant functioning as a radical scavenger, a secondary antioxidant functioning as a hydrogen peroxide decomposer or the like.

Examples of the primary antioxidant include cerium-based antioxidants such as cerium oxide and cerium (III) nitrate hexahydrate antioxidants, terephthalate-based antioxidants and the like. The secondary antioxidants include manganese-based antioxidants such as manganese oxide antioxidants.

However, as reported in the related arts, cerium oxide may have a problem that antioxidant activity is inversely proportional to long-term stability. There is an urgent need for research on novel antioxidants with both better antioxidant activity and excellent long-term stability.

The above information disclosed in this Background section is provided only for enhancement of understanding of the background of the invention and therefore it may contain information that does not form the prior art that is already known in this country to a person of ordinary skill in the art.

SUMMARY OF THE DISCLOSURE

In preferred aspects, the present invention provides a membrane-electrode assembly that has greatly improved durability by including a novel antioxidant having excellent antioxidant activity and superior long-term stability.

The objects of the present invention are not limited to those described above. The objects of the present invention will be clearly understood from the following description and could be implemented by means defined in the claims and a combination thereof.

In one aspect, the present invention provides a membrane-electrode assembly for fuel cells with improved durability. The membrane-electrode assembly may include an electrolyte membrane, and one or more electrodes associated with the electrolyte membrane. For example, a pair of electrodes may be disposed on both or opposing surfaces of the electrolyte membrane. By stating that an electrode is "associated with the electrolyte membrane" as used herein, it is meant that the electrolyte is used in operation of the electrode. Preferably, at least one of the electrolyte membrane and the electrodes may include an antioxidant, and the antioxidant may include a samarium (Sm)-doped cerium oxide.

The term "samarium (Sm)-doped cerium oxide" as used herein refers to a cerium oxide that includes one or more of samarium ions replacing or substituting cerium ions. For example, samarium (III) ions ($Sm^{3+}$) can substitute a portion of cerium (IV) ions in cerium oxide ($CeO_2$) such that the samarium (III) ions ($Sm^{3+}$) replace the cerium (IV) ions in a lattice structure of $CeO_2$. A portion of the samarium (III) ions ($Sm^{3+}$) may suitably be about 0.1%, about 1%, about 3%, about 5%, about 10%, about 20%, about 30%, about 40%, about 50%, about 60%, about 70%, about 80%, or about 90% of the total number of the metal ions (e.g., total number of cerium (IV) ions in non-doped $CeO_2$) that can be accommodated in $CeO_2$.

The SDC may be represented by the following Formula 1:

$$Sm_xCe_{1-x}O_{2-\delta}, \qquad \text{[Formula 1]}$$

wherein x is $0 < x \leq 0.5$ and δ provides an oxygen vacancy value making the compound of Formula 1 electrically neutral.

The SDC may suitably have been thermally treated at a temperature of about 100° C. to 1,000° C.

The SDC may suitably have been thermally treated for about 10 minutes to 10 hours. The SDC may have main diffraction peaks at 2Θ of 28±1.0°, 32±1.0°, 47±1.0° and 56±1.0° in an XRD spectrum.

The SDC may suitably have a crystallite size of about 5.5 nm to 60 nm.

The SDC may suitably have a BET surface area of about 10 m²/g to 190 m²/g.

The electrolyte membrane may include a perfluorinated sulfonic acid-based ionomer, a reinforcement layer to improve mechanical rigidity of the electrolyte membrane and the antioxidant. The electrolyte membrane may suitably include the antioxidant in an amount of about 0.05% by weight to 20% by weight, based on the total weight of the perfluorinated sulfonic acid-based ionomer.

In another aspect, the present invention provides a polymer electrolyte membrane fuel cell including the membrane-electrodes assembly as described herein.

Further provided is a vehicle that includes the polymer electrolyte membrane fuel cell including the membrane-electrodes assembly as described herein.

In other aspect, the present invention provide a method of preparing a membrane-electrodes assembly. The method may include heat treating a samarium (Sm)-doped cerium oxide (SDC); providing the heat treated SDC to at least one of an electrolyte membrane and a pair electrodes comprises; and dispose the pair of electrodes on both surfaces of the electrolyte membrane.

The SDC may suitably be represented by the following Formula 1:

[Formula 1]

wherein x is 0<x≤0.5 and δ provides an oxygen vacancy value making the compound of Formula 1 electrically neutral.

The SDC may suitably have been thermally treated at a temperature of about 100° C. to 1,000° C.

The SDC may suitably have been thermally treated for about 10 minutes to 10 hours.

The SDC may have main diffraction peaks at 2Θ of 28±1.0°, 32±1.0°, 47±1.0° and 56±1.0° in an XRD spectrum.

The SDC may have a crystallite size of about 5.5 nm to 60 nm. The SDC may have a BET surface area of about 10 $m^2/g$ to 190 $m^2/g$.

The electrolyte membrane may include a perfluorinated sulfonic acid-based ionomer and the antioxidant. The electrolyte membrane may suitably include the antioxidant in an amount of 0.05% by weight to 20% by weight, based on the total weight of the perfluorinated sulfonic acid-based ionomer.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

The objects described above, and other objects, features and advantages will be clearly understood from the following preferred embodiments with reference to the annexed drawings. However, the present invention is not limited to the embodiments and will be embodied in different forms. The embodiments are suggested only to offer thorough and complete understanding of the disclosed contents and sufficiently inform those skilled in the art of the technical concept of the present invention.

Like reference numbers refer to like elements throughout the description of the figures. In the drawings, the sizes of structures are exaggerated for clarity. It will be understood that, although the terms first, second, etc. may be used herein to describe various elements, these elements should not be limited by these terms and are used only to distinguish one element from another. For example, within the scope defined by the present invention, a first element may be referred to as a second element and similarly, a second element may be referred to as a first element. Singular forms are intended to include plural forms as well, unless context clearly indicates otherwise.

It will be further understood that the terms "comprises", "has" and the like, when used in this specification, specify the presence of stated features, numbers, steps, operations, elements, components or combinations thereof, but does not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all the numbers, figures and/or expressions. In addition, when number ranges are disclosed in the description, these ranges are continuous and include all numbers from the minimum to the maximum including the maximum within the ranges unless otherwise defined. Furthermore, when the range is referred to as an integer, it includes all integers from the minimum to the maximum including the maximum within the range, unless otherwise defined. Further, unless specifically stated or obvious from context, as used herein, the term at represent ingredients, reaction conditions, polymer compositions and amounts of mixtures used in the specification are approximations that reflect various uncn 10%, 9%, 8%, 7%, 6%, 5%, 4%, 3%, 2%, 1%, 0.5%, 0.1%, 0.05%, or 0.01% of the stated value.

Unless otherwise clear from the context, all numerical values provided herein are modified by the term "about."

It should be understood that, in the specification, when the range is referred to regarding a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
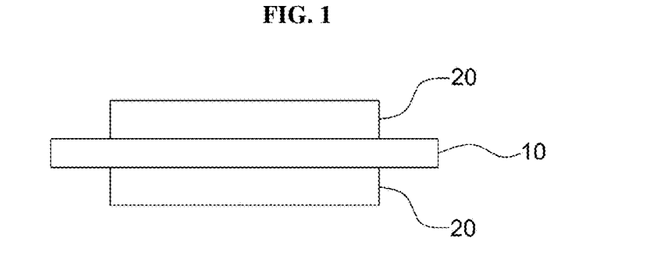
FIG. 1 shows an exemplary membrane-electrode assembly according to an exemplary embodiment of the present invention.

FIG. 1 schematically illustrates an exemplary membrane-electrode assembly according to an exemplary embodiment of the present invention. Referring to FIG. 1, the membrane-electrode assembly may include an electrolyte membrane 10 and a pair of electrodes 20 disposed on both surfaces of the electrolyte membrane. Here, "a pair of electrodes" means an anode and a cathode which are disposed on opposite surfaces or sides of the electrolyte membrane.

Preferably, at least one of the electrolyte membrane 10 and the pair of electrodes 20 may include an antioxidant.

The electrolyte membrane 10 may include a perfluorinated sulfonic acid-based ionomer, a reinforcement layer to improve mechanical rigidity of the electrolyte membrane and the antioxidant. The electrolyte membrane 10 may include the antioxidant in an amount of about 0.05% by weight to 20% by weight, based on the total weight of the perfluorinated sulfonic acid-based ionomer. When the content of the antioxidant is less than about 0.05% by weight, i chemical durability of the electrolyte membrane may not be maintained due to excessively low antioxidant activity, and when the content thereof is greater than about 20% by weight, proton conductivity of the electrolyte membrane may be decreased and brittleness may be increased.

The antioxidant may be Sm-doped cerium oxide (hereinafter, referred to as "SDC"). The SDC may is a compound that includes samarium (III) ions ($Sm^{3+}$) substituting a portion of cerium (IV) ions in cerium oxide ($CeO_2$) having a fluorite structure. As a result, oxygen vacancy may be increased and redox reaction properties of cerium ions may be improved.

The antioxidant may be represented by the following Formula 1.

$$Sm_xCe_{1-x}O_{2-\delta}$$ [Formula 1]

wherein x is 0<x≤0.5 and δ provides an oxygen vacancy value making the compound of Formula 1 electrically neutral, for example, 0<δ≤0.25.

When x is greater than about 0.5, the inherent structural properties of cerium oxide may be deteriorated. For this reason, x is preferably within the range.

As mentioned above, antioxidant activity may be increased, but the long-term stability may be deteriorated as decreasing crystallize size of antioixdants. The present inventors realized that, when the crystallite size and surface area of SDC are controlled by thermally treating SDC at a high temperature, both superior antioxidant activity and excellent long-term stability can be secured.

Preferably, the antioxidant may be SDC which has been thermally treated at a temperature of about 100° C. to 1,000° C. for 10 minutes to 10 hours.

When the temperature of thermal treatment is less than about 100° C., the effect of thermal treatment may not be sufficient, and antioxidant activity of SDC may be increased as long-term stability may be decreased. When the temperature is greater than about 1,000° C., the effect of thermal treatment may be excessive, and long-term stability of SDC may be increased, but antioxidant activity may be decreased.

In addition, when time for thermal treatment is shorter than 10 minutes, the effect of thermal treatment is insufficient, antioxidant activity of SDC is high, but long-term stability is low, and when the time is longer than 10 hours, the time for process cycle is excessively long.

The thermal treatment of SDC may be carried out under an air atmosphere.

EXAMPLE

Hereinafter, the antioxidant according to the present invention will be described in more detail with reference to the following Examples.

Preparation of Antioxidant

An antioxidant was prepared in accordance with the conditions shown in the following Table 1.

TABLE 1

| Item | Composition | Thermal treatment temperature [° C.] | Thermal treatment time [hour] |
|---|---|---|---|
| Example 1 (SDC-400) | $Sm_{0.2}Ce_{0.8}O_{2-\delta}$, δ provides an oxygen vacancy value making the compound of Formula 1 electrically neutral | 400 | 2 |
| Example2 (SDC-600) | | 600 | 2 |
| Example3 (SDC-800) | | 800 | 2 |
| Example4 (SDC-1000) | | 1,000 | 2 |
| Comparative Example1 (SDC-NA) | | No thermal treatment | No thermal treatment |
| Comparative Example2 (SDC-1100) | | 1,100 | 2 |

The antioxidants according to Examples 1 to 4, and Comparative Examples 1 and 2 were subjected to microstructure analysis, antioxidant activity testing and long-term stability testing.

Microstructure Analysis

1) X-Ray Diffraction (XRD) Analysis

Changes in crystal sizes of the antioxidants according to Examples 1 to 4, and Comparative Examples 1 and 2 were measured by X-ray diffraction. Results are shown in FIG. 2.

Figure 2:
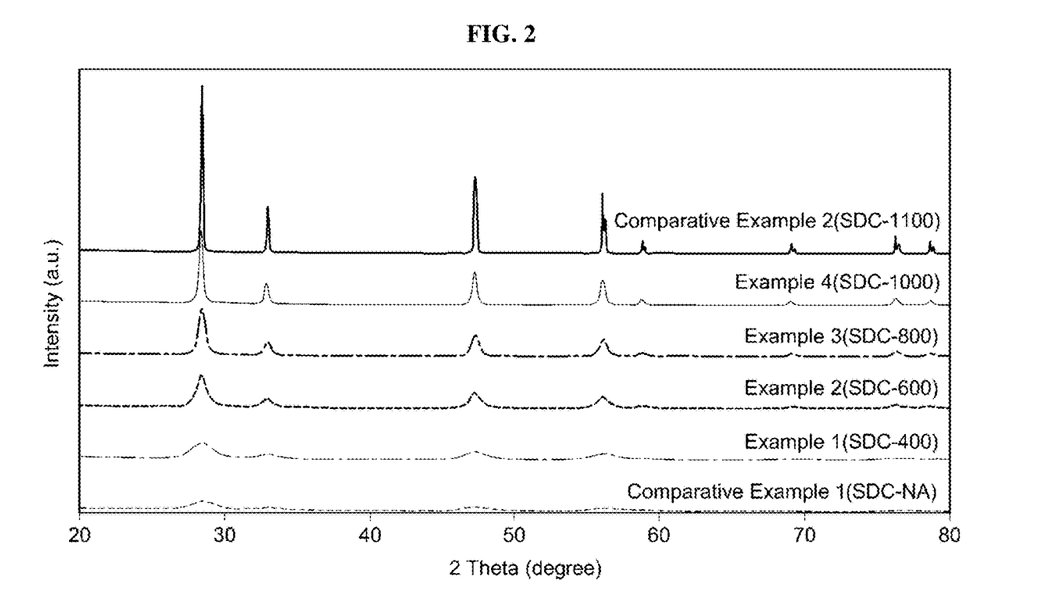
FIG. 2 shows X-ray diffraction (XRD) analysis results with regard to an exemplary antioxidant (samarium (Sm)-doped cerium oxide) according to an exemplary embodiment of the present invention.

As shown in FIG. 2, Examples 1 to 4 and Comparative Example 2, which were thermally treated at a high temperature, compared to Comparative Example 1, showed gradual noticeable growth in crystal characteristic peaks. Specifically, major diffraction peaks having high intensities at 2Θ=28±1.0°, 32±1.0°, 47±1.0° and 56±1.0° are shown in the XRD spectrum.

2) Calculation of Crystal Size

The crystallite sizes of antioxidants of Examples 1 to 4, and Comparative Examples 1 and 2 were calculated using the Debye-Scherrer equation. Results are shown in the following Table 2.

TABLE 2

| Item | Crystallite size [nm] |
|---|---|
| Example 1 (SDC-400) | 6.8 |
| Example 2 (SDC-600) | 13.3 |
| Example 3 (SDC-800) | 22.4 |
| Example 4 (SDC-1000) | 43.8 |
| Comparative Example 1 (SDC-NA) | 5.1 |
| Comparative Example 2 (SDC-1100) | 365.8 |

As shown in Table 2, as thermal treatment temperature increased, the crystallite size of SDC gradually increased. However, when thermal treatment temperature was 1,100° C., the crystallite size of SDC rapidly increased to 365.8 nm, which is excessively large.

3) Measurement of BET (Brunauer-Emmett-Teller) Surface Area

BET surface areas of antioxidants according to Examples 1 to 4 and Comparative Examples 1 and 2 were measured using a surface area analysis machine (TriStar II, Micromeritics Co., USA). Results are shown in FIG. 3.

Figure 3:
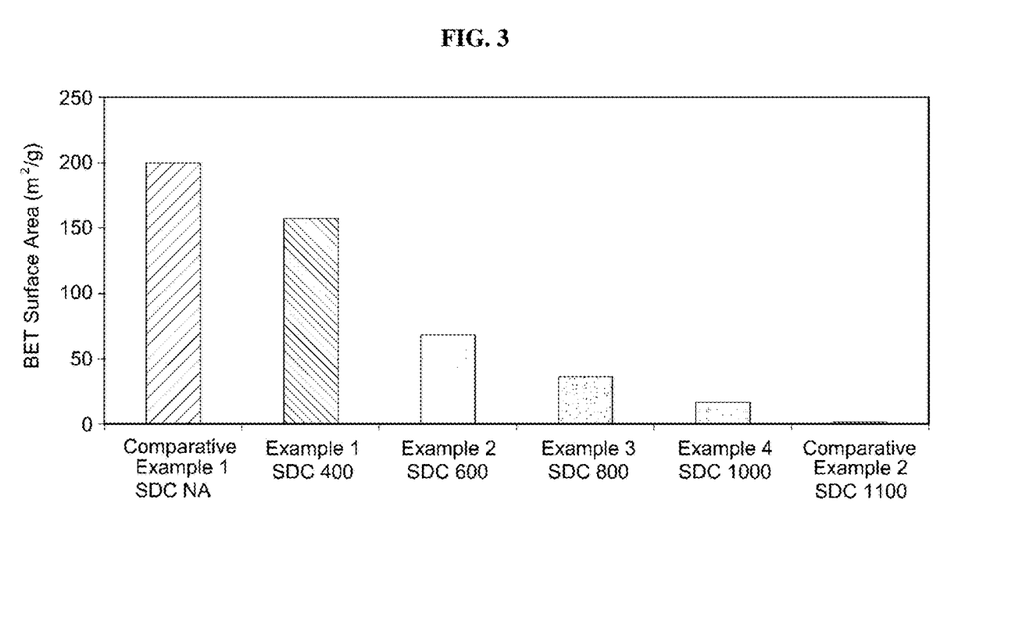
FIG. 3 shows measurement results of BET surface area with regard to an exemplary antioxidant (samarium (Sm)-doped cerium oxide) according to an exemplary embodiment of the present invention.

Considering results of Comparative Example 1, Examples 1 to 4 and Comparative Example 2 shown in FIG. 3, when high-temperature thermal treatment was performed, the BET surface area of the antioxidant decreased.

In other words, the antioxidant of Comparative Example 1 had a BET surface area of 199.2 m$^2$/g, the antioxidants of Examples 1 to 4 having been thermally treated at a temperature of 400° C., 600° C., 800° C. and 1,000° C. had gradually decreasing BET surface areas of 157.0 m$^2$/g, 68.2 m$^2$/g, 36.1 m$^2$/g and 17.1 m$^2$/g, respectively and the antioxidant of Comparative Example 2 thermally treated at a temperature of 1,100° C. had a considerably small BET surface area of 1.8 m$^2$/g.

Antioxidant Activity Testing

1) Antioxidant Activity Testing by Methyl Violet Method

A methyl violet method offering rapid naked eye inspection was used to test antioxidant activities of antioxidants according to Examples 1 to 4 and Comparative Examples 1 and 2.

Methyl violet was mixed with iron (II) sulfate heptahydrate (FeSO$_4$ 7H$_2$O), hydrogen peroxide, an antioxidant and the like, and change in color was observed.

As antioxidant activity of the antioxidant increases, the original color of methyl violet is maintained well, and as antioxidant activity decreases, violet turns pale and finally becomes colorless.

Methyl violet, iron (II) sulfate heptahydrate and hydrogen peroxide were mixed in a weight ratio of 30:1:1 to prepare a methyl violet test solution, and antioxidants according to Examples 1 to 4 and Comparative Examples 1 and 2 were each added in an amount of 10 mg to the solution. Results are shown in FIG. 4.

Figure 4:
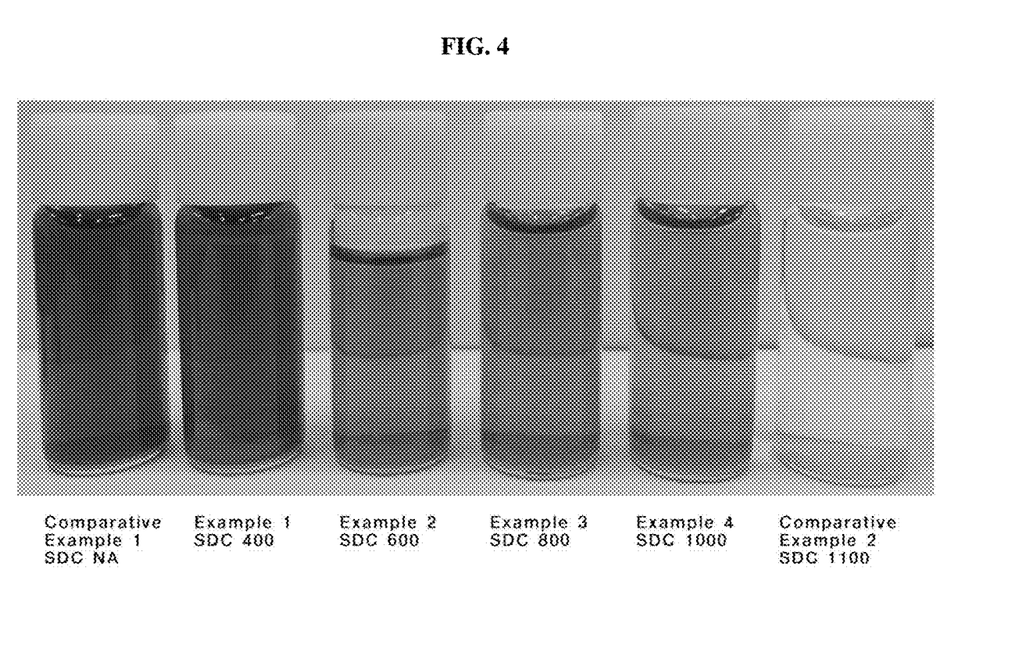
FIG. 4 shows test results of antioxidant activity with regard to an exemplary antioxidant (samarium (Sm)-doped cerium oxide) according to an exemplary embodiment of the present invention by a methyl violet method.

As shown in FIG. 4, in both Comparative Example 1 and Comparative Example 2, violet color of methyl violet gradually became pale. Specifically, Examples 1 to 4 maintained their vivid violet color even though some thereof became pale, whereas the solution color of Comparative Example 2 rapidly became colorless. This indicates that Examples 1 to 4 maintained good antioxidant activity, whereas Comparative Example 2 had a considerably deteriorated antioxidant activity.

2) Antioxidant Activity Testing by UV-Visible Spectroscopy

The absorbance intensity of a methyl violet test solution was measured and compared to test antioxidant activity more accurately.

When the antioxidant activity of the antioxidant is excellent, high absorption intensity appears at 582 nm, which is an inherent absorption wavelength of methyl violet, whereas, when antioxidant activity is low, low absorption intensity appears.

Absorbance intensities of methyl violet test solutions according to Examples 1 to 4 and Comparative Examples 1 and 2 were measured using a UV-visible spectrometer (UV-3600, Shimadzu Corporation, Japan). Results are shown in FIG. 5.

Figure 5:
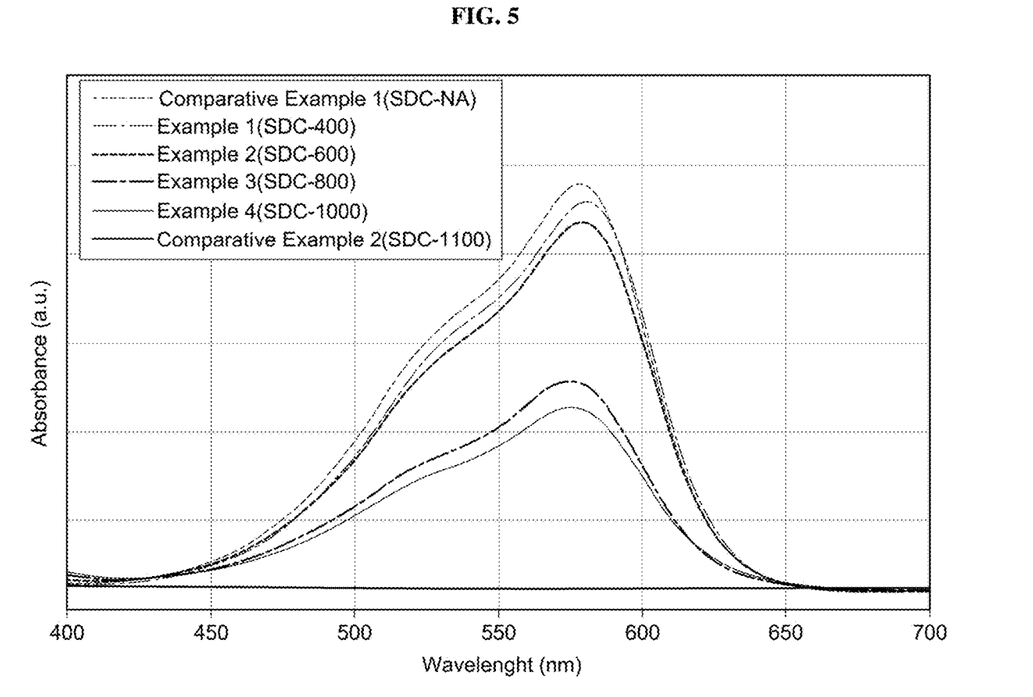
FIG. 5 shows test results of antioxidant activity with regard to an exemplary antioxidant (samarium (Sm)-doped cerium oxide) according to an exemplary embodiment the present invention by UV-visible spectroscopy.

As shown in FIG. 5, UV absorption intensity gradually decreased from Comparative Example 1 to Comparative Example 2. In other words, at a wavelength of 582 nm, Comparative Example 1 maintained a high absorption intensity, whereas, Examples 1 to 4 had a partially decreased absorption intensity, but still exhibited considerable absorption intensity and good antioxidant activity. On the other hand, Comparative Example 2 showed rapidly decreased absorption intensity, and had a considerable decrease in antioxidant activity.

Long-Term Stability Testing

1) Long-Term Stability Testing by Dissolution Test

To test long-term stability of the antioxidants according to Examples 1 to 4 and Comparative Examples 1 and 2, the antioxidants were subjected to dissolution testing under acidic conditions simulated from actual operation conditions of polymer electrolyte membrane fuel cells. First, the antioxidant was dispersed and dissolved in 12 M sulfuric acid (H$_2$SO$_4$) for 72 hours, and absorption intensity of the solution was measured by UV-visible spectroscopy, to test resistance to dissolution of the antioxidant.

As resistance to dissolution or stability of the antioxidant against sulfuric acid decreases, the amount of antioxidant dissolved in sulfuric acid increases and absorption intensity thereof also increases, whereas, as resistance to dissolution or stability increases, absorption intensity thereof decreases. Specifically, long-term stability of the antioxidant can be seen by observing a change in absorption intensity at a wavelength of 320 nm, which is a characteristic value of Ce$^{4+}$ ions in the antioxidant, among absorption wavelengths of UV-visible spectroscopy.

A solution of the antioxidant in sulfuric acid was diluted in deionized water at 1:9 vol %/vol % for measurement of absorption intensity. Results are shown in FIG. 6.

Figure 6:
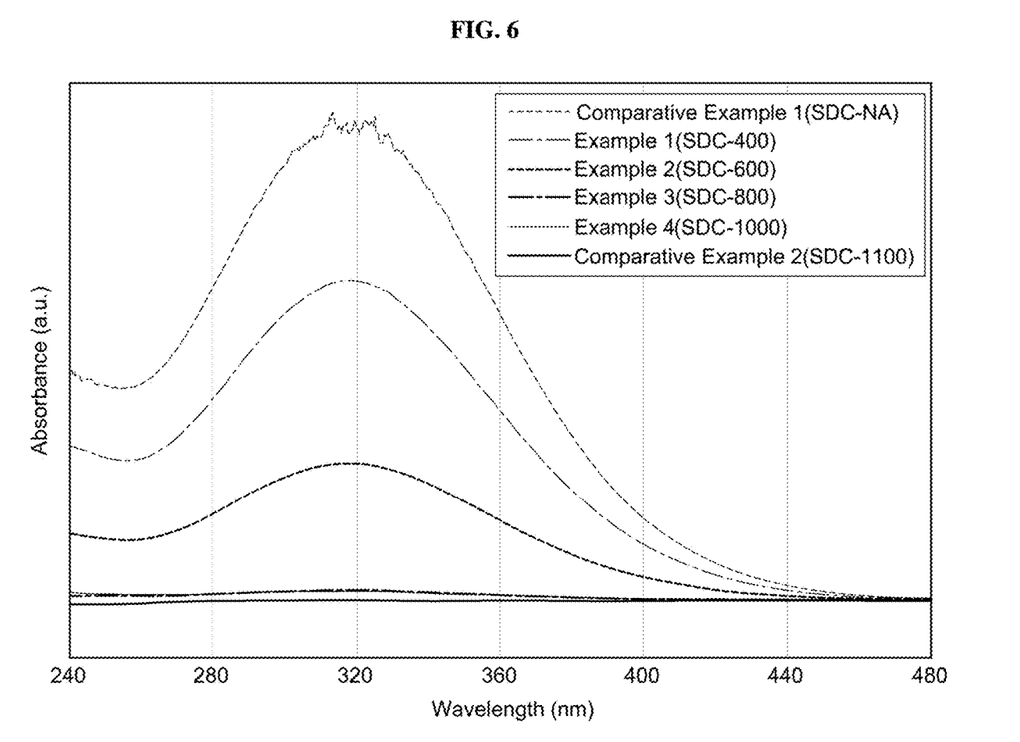
FIG. 6 shows test results of long-term stability with regard to an exemplary antioxidant (samarium (Sm)-doped cerium oxide) according to an exemplary embodiment the present invention by dissolution testing.

As shown in FIG. 6, Comparative Example 1 showed a considerably high absorption intensity and thus very poor long-term stability. On the other hand, in Examples 1 to 4 and Comparative Example 2, as UV-visible absorption intensity gradually decreased, resistance to dissolution against sulfuric acid increased.

Antioxidant Activity and Long-Term Stability Testing

The results are summarized and shown in the following Table 3.

TABLE 3

| Item | Thermal treatment temperature [° C.] | Microstructure properties | | Antioxidant activity | Long-term stability |
|---|---|---|---|---|---|
| | | Crystallite size [nm] | BET surface area [m²/g] | | |
| Comparative Example1 | No thermal treatment | 5.1 | 199.2 | Excellent | Bad |
| Example 1 | 400 | 6.8 | 157.0 | Excellent | Good |
| Example 2 | 600 | 13.3 | 68.2 | Excellent | Good |
| Example 3 | 800 | 22.4 | 36.1 | Good | Excellent |
| Example 4 | 1000 | 43.8 | 17.1 | Good | Excellent |
| Comparative Example 2 | 1100 | 365.8 | 1.8 | Bad | Excellent |

As shown in the above Table 3, in order to secure both good antioxidant activity and long-term stability of the antioxidant, the crystallite size of the antioxidant were 5.5 nm to 60 nm and the BET surface area thereof were 10 m²/g to 190 m²/g. For this purpose, SDC represented by the following Formula 1 should be thermally treated at a temperature of 100° C. to 1,000° C. for 10 minutes to 10 hours.

$$Sm_xCe_{1-x}O_{2-\delta}$$ [Formula 1]

wherein x satisfies 0<x≤0.5 and δ provides an oxygen vacancy value making the compound of Formula 1 electrically neutral.

As apparent from the foregoing, the present invention provides a novel antioxidant having excellent antioxidant activity as well as superior long-term stability and a membrane-electrode assembly, to which the antioxidant is introduced, can exhibit greatly improved durability.

The effects of the present invention are not limited to those mentioned above. It should be understood that the effects of the present invention include all effects that can be inferred from the foregoing description of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A membrane-electrode assembly for fuel cells comprising:
   an electrolyte membrane; and
   one or more electrodes associated with the electrolyte membrane;
   wherein the electrolyte membrane comprises a perfluorinated sulfonic acid-based ionomer and an antioxidant, wherein the antioxidant comprises a samarium (Sm)-doped cerium oxide (SDC), and
   wherein the electrolyte membrane comprises the antioxidant in an amount of 0.05% by weight to 20% by weight, based on the total weight of the perfluorinated sulfonic acid-based ionomer.

2. The membrane-electrode assembly of claim 1, wherein a pair of the electrodes are disposed on both surfaces of the electrolyte membrane.

3. The membrane-electrode assembly of claim 1, wherein the SDC is represented by the following Formula 1:

$$Sm_xCe_{1-x}O_{2-\delta}$$ [Formula 1]

wherein x is 0<x≤0.5 and δ provides an oxygen vacancy value making the compound of Formula 1 electrically neutral.

4. The membrane-electrode assembly of claim 1, wherein the SDC has been thermally treated at a temperature of about 100° C. to 1,000° C.

5. The membrane-electrode assembly of claim 4, wherein the SDC has been thermally treated for about 10 minutes to 10 hours.

6. The membrane-electrode assembly of claim 1, wherein the SDC has main diffraction peaks at 2Θ of 28±1.0°, 32±1.0°, 47±1.0° and 56±1.0° in an XRD spectrum.

7. The membrane-electrode assembly of claim 1, wherein the SDC has a crystallite size of about 5.5 nm to 60 nm.

8. The membrane-electrode assembly for fuel cells according to claim 1, wherein the SDC has a BET surface area of about 10 m²/g to 190 m²/g.

9. A polymer electrolyte membrane fuel cell comprising a membrane-electrodes assembly of claim 1.

10. A vehicle comprising a polymer electrolyte membrane fuel cell of claim 9.

11. A method of preparing a membrane-electrodes assembly, comprising heat treating a samarium (Sm)-doped cerium oxide (SDC);
   providing the heat treated SDC to at least one of an electrolyte membrane and a pair electrodes comprises; and
   dispose the pair of electrodes on both surfaces of the electrolyte membrane,
   wherein the electrolyte membrane comprises a perfluorinated sulfonic acid-based ionomer and the antioxidant,
   wherein the electrolyte membrane comprises the antioxidant in an amount of 0.05% by weight to 20% by weight, based on the total weight of the perfluorinated sulfonic acid-based ionomer.

12. The method of claim 11, wherein the SDC is represented by the following Formula 1:

$$Sm_xCe_{1-x}O_{2-\delta}$$ [Formula 1]

wherein x is 0<x≤0.5 and δ provides an oxygen vacancy value making the compound of Formula 1 electrically neutral.

13. The method of claim 11, wherein the SDC has been thermally treated at a temperature of about 100° C. to 1,000° C.

14. The method of claim 13, wherein the SDC has been thermally treated for about 10 minutes to 10 hours.

15. The method of claim 11, wherein the SDC has main diffraction peaks at 2Θ of 28±1.0°, 32±1.0°, 47±1.0° and 56±1.0° in an XRD spectrum.

16. The method of claim 11, wherein the SDC has a crystallite size of about 5.5 nm to 60 nm.

17. The method of claim 11, wherein the SDC has a BET surface area of about 10 m²/g to 190 m²/g.

\* \* \* \* \*